United States Patent Office 3,087,919
Patented Apr. 30, 1963

3,087,919
PROCESS FOR POLYMERIZING METHACRYLONITRILE
William Kenneth Wilkinson, Waynesboro, Va., assignor to E. I. du Pont de Nemours and Company, Wilmington, Del., a corporation of Delaware
No Drawing. Filed May 27, 1958, Ser. No. 738,028
1 Claim. (Cl. 260—88.7)

This invention is concerned with new macromolecular polymers of methacrylonitrile and with processes for their preparation.

The methacrylonitrile polymers of the prior art have not become commercially acceptable as molded plastics or synthetic fibers due to their discoloration tendencies under the influence of heat and because of their relatively low distortion temperatures. The utility of products prepared from these polymers has also been limited because of their low solvent resistance to common organic solvents (Schildknecht, "Vinyl and Related Polymers," Wiley, New York, 1952). Later work by Grassi and McNeill (J. Chem. Soc. 1956, 3929) has shown that the discoloration problems in methacrylonitrile polymers can be minimized by careful purification of the methacrylonitrile monomer prior to polymerization. Exceedingly white polymers have recently been prepared from methacrylonitrile monomer which has been washed with dilute sodium hydroxide and then distilled from phosphorus pentoxide. However, these polymers are still deficient because of their low softening temperature and ready dissolution in organic solvents.

One object of this invention is to provide methacrylonitrile polymers of good color, good thermal properties and good solvent resistance. It is a further object to provide efficient polymerization processes for the preparation of these polymers. Other objects will appear hereinafter.

These objects are accomplished by polymerizing methacrylonitrile monomer dissolved in selected organic solvents using n-butyl lithium as catalyst.

The specificity of the polymerization system is quite surprising. With some organic liquid polymerization media the polymerization proceeds smoothly but the product does not have the properties of the product prepared in the systems of the present invention. The use of ionic initiators for the polymerization of methacrylonitrile is not new (see Beaman, J. Am. Chem. Soc., 70, 3115, 1948). However, only certain specific polymerization media and catalyst initiator combinations yield products of improved properties over those obtainable by typical free radical reactions. The product of the present invention is distinguished by its high softening point, lack of solubility in acetone and its high density.

The invention will be better understood according to the following examples which are meant to be illustrative and not limitative. In these examples, the parts and percentages are by weight unless otherwise specified.

Example I

A 100-ml. 3-neck flask was fitted with a gas tight stirrer, a nitrogen inlet and a dropping funnel. The equipment was heated with a gas flame while dry nitrogen was slowly passed through it. After heating the flask to approximately 200° C., the flame was removed and the flask allowed to cool in the presence of dry nitrogen. A mixture of 10 ml. of methacrylonitrile and 30 ml. of dry toluene was introduced into the flask with minimum exposure to air. The toluene was purified by distillation from a sodium dispersion prior to its use and was stored under nitrogen. The methacrylonitrile was purified by extraction with 2–5% aqueous sodium hydroxide washed with water to remove alkali and distilled from phosphorus pentoxide. The purified product was collected in a flask blanketed with nitrogen, and was stored under nitrogen until use. The reaction vessel containing the mixture of methacrylonitrile and toluene was cooled to −78° C. by surrounding it with a Dry Ice-acetone bath. n-Butyl lithium catalyst solution was prepared as follows: Into a 500-ml. flask equipped with stirrer, reflux condenser, nitrogen inlet and dropping funnel was placed 150 ml. of dry heptane (distilled from sodium dispersion and stored under nitrogen) and 6.0 grams of lithium metal. The mixture was cooled to 0° C. and 67 grams of n-butyl bromide was added drop-wise over a thirty-minute period. The mixture was stirred during this addition and for an additional two-hour period, all under a blanket of nitrogen. The reaction mixture was then filtered under nitrogen to remove lithium bromide and other solid by-products. A 2-ml. portion of the filtrate was diluted with methanol and titrated with a standardized hydrochloric acid solution using phenolphthalein indicator. This analysis showed that 1 ml. of the heptane solution contained 1 milliequivalent of n-butyl lithium.

A 5-ml. portion of the catalyst solution was added through the dropping funnel over a period of twelve minutes with stirring. The cooling bath was then removed from the reaction vessel and a solution of 1 ml. of concentrated hydrochloric acid in 9 ml. of methanol was added and stirring was continued for an additional ten minutes. The solid polymeric product was filtered, washed with methanol and dried at 60° C. for three hours. The yield of product was 87%. It had an intrinsic viscosity of 1.29 as measured in dimethylformamide solution. When placed in excess acetone, 30% of this material was found to be insoluble. The insoluble fraction had a softening point of 135–138° C. Part of this insoluble fraction was dissolved in dimethylformamide to form a 10% solution. A film was cast from this solution on a glass plate. It was dried in air at 70° C. for two hours and was then boiled in water for fifteen minutes. The resulting film was quite flexible. It was found to have a density of 1.133, as measured in a carbon tetrachloride-heptane density gradient tube.

Example II

In a carefully dried apparatus as described in Example I was placed 10 ml. of methacrylonitrile and 30 ml. of dioxane. The mixture was stirred and cooled to 10° C. in an ice bath. Stirring was continued during the addition of 5 ml. of the n-butyl lithium catalyst solution described in Example I. After fifteen minutes of additional stirring, the ice bath was removed and 10 ml. of methanol containing hydrochloric acid was added to the mixture. The solid polymer was filtered off, washed with excess methanol and dried at 60° C. for four hours.

This product which was obtained in 43% yield, was found to be completely insoluble in acetone. It had an intrinsic viscosity of 0.66 as measured in dimethylformamide solution and a softening point of 138–143° C. Its density was 1.133, as measured in a density gradient tube. This latter measurement was carried out on the polymer itself rather than on a film from that polymer.

Example III

Using the apparatus of the previous examples, a mixture of 10 ml. of methacrylonitrile and 30 ml. of tetramethylene cyclic sulfone was stirred at 25° C. and 1 ml. of the n-butyl lithium catalyst solution was added. After 60 minutes of stirring the reaction mixture was treated with methanol containing hydrochloric acid and the solid product obtained was filtered, washed and dried as before. In this experiment only a 5% yield of polymeric product was obtained. However, this material was found to be completely insoluble in acetone and to have a density of 1.133.

*Example IV*

A series of experiments was carried out according to the descriptions of the previous examples but using other diluents in place of the toluene, dioxane or tetramethylene cyclic sulfone of those examples. The products obtained showed no advantages over the prior art. The diluents included chlorobenzene, heptane, tetrahydrofuran, benzene, acetonitrile, carbon tetrachloride, chloroform, dimethylsulfoxide, and 50/50 mixtures of chlorobenzene/toluene, chlorobenzene/heptane, heptane/toluene, and heptane/dioxane. n-Butyl lithium catalyst was used in all cases and the reactions were carried out at temperatures between −70° C. and 25° C. In the presence of acetonitrile, carbon tetrachloride, chloroform and dimethylsulfoxide, no solid product was obtained. In the other reactions the yields of product varied between 10% and 87%. The various products had intrinsic viscosities between 0.35 and 0.74. Every one of these products was completely soluble in acetone at room temperature. The highest density found for any of these samples was 1.100.

An n-butyl lithium initiated polymer for example prepared in a chlorobenzene/toluene medium was acetone soluble and showed a density of 1.020 and a softening point of 120–125° C.

*Example V*

This example describes the preparation of polymethacrylonitrile using a free radical catalyst.

In a 1000-ml. flask was placed 640 ml. of dry toluene, 160 ml. of methacrylonitrile purified as described in previous examples, and 1.6 grams of α,α′-azodiisobutyronitrile as catalyst. Dry nitrogen was bubbled through the mixture to remove air from the vessel and the flask was then stoppered to prevent air from entering. The flask was then placed in a water bath at 70° C. and kept there for sixteen hours with occasional shaking. At the end of that period the polymer which precipitated was filtered and washed with methanol. After drying at 60° C. under vacuum, the product was found to have an intrinsic viscosity of 0.79. The yield of polymer was 36.5%. Unlike the products of the present invention, this material was completely soluble in acetone, had a density of 1.040 and a softening point of 120–127° C.

In other experiments carried out in like fashion using varying amounts of catalyst, products varying in intrinsic viscosity between 0.12 and 1.02 were prepared. The yields of these products in 18 hours were between 24 and 49%. All products were soluble in acetone and no product had a density above 1.04.

An acrylonitrile homopolymer prepared according to the procedure of this example showed a softening point of 132–138° C.

*Example VI*

Additional experiments were carried out according to the procedures of Examples I and II using either toluene or dioxane as the polymerization medium. Temperatures between −76° C. and +10°C. were used. The amounts of catalyst used were varied between 1 ml. and 5 ml. of the solution described in Example I. Additions were sometimes made as rapidly as possible and in other cases were carried out over a period up to ten minutes. Polymerization appeared to be complete within a few seconds after the cataylst was added, but in all cases an additional 15 minutes of stirring was included before addition of methanol to precipitate the product.

After filtration of the products, they were washed with methanol and dried. In some instances the drying was carried out at room temperature. The products dried at room temperature showed a higher degree of acetone soluble material than those samples which were dried at a temperature of 60° C. or above. When these products were heated at 60° C., substantial amounts of acetone insoluble material was formed. The acetone insoluble fractions obtained in the various runs showed densities of 1.120 and higher.

The softening temperatures of various polymers described herein were all determined by placing polymer samples on a Fisher-Johns melting point block and pressing them against the block frequently with a spatula while heating the block at a rate to give a 10° C. temperature increase per minute. The temperature range over which the powdered polymer changed to a semiclear plastic mass was noted.

The process of the invention leads to the production of polymethacrylonitrile of entirely new and unexpected properties. The methacrylonitrile polymers prepared in either toluene, dioxane or tetramethylene cyclic sulfone using n-butyl lithium catalyst and isolated in acetone insoluble form show higher softening temperatures as compared to methacrylonitrile polymers prepared by prior art methods. The softening temperature (at least 135° C.) has been increased to the range of acrylonitrile homopolymer. The polymerization using a certain specified catalyst and reaction medium may be carried out at temperatures between about −78° C. and about 30° C. The reaction time is not critical. Polymerization takes place within a few seconds and additional reaction time up to 120 minutes causes no further change. The polymerization should be carried out under conditions which lead to initimate mixing of the reaction ingredients. Stirred vessels are quite satisfactory but because of the rapidity of the reaction, a tubular reactor which allows introduction of reactants into one end and removal of products from the other may also be used. Regardless of the type of vessel used, it is important that the reaction be carried out in an inert atmosphere free from oxygen, materials containing active hydrogen atoms and especially water.

While it is not intended that this invention be bound by any particular theory or explanation, it is believed that the improved properties of the products of this invention are attributable to a combination of linearity of the polymer molecules and regularity of these molecules with regard to the spatial configuration of the nitrile and methyl groups. Infrared analysis shows that the novel polymers, like the prior art products, are the result of 1,2 addition polymerization. The absence of 1,4 addition is also shown by the fact that these polymers do not undergo chain scission when treated with strongly alkaline solutions at the boil. This property is true of polymethacrylonitrile generally and distinguishes it from polyacrylonitrile which shows a reduction in intrinsic viscosity when hydrolyzed. The linearity and symmetry of substituents which the novel products are believed to possess can be expected to lead to improved ease of crystallization and resulting polymer insolubility.

It is believed that crystallization of the novel crystallizable polymers of the invention is brought about during drying of the polymers at temperatures of at least about 60° C. The resulting polymers are not only insoluble in acetone but are also insoluble in nitromethane and hot methylene chloride, each of which is a good solvent for polymethacrylonitrile prepared using free radical catalysts.

The products of the invention combine many of the generally acknowledged advantages of acrylonitrile polymers with the advantages of polymethacrylonitrile. Thus, the high softening point of acrylonitrile and the good color of methacrylonitrile polymers are now obtained. The new polymer may be shaped into films or fibers from dimethylformamide solutions to yield products which are unaffected by organic liquids such as acetone, nitromethane or methylene chloride. It is more stable to alkali and to heating than an acrylonitrile polymer and shows far better adhesion to glass, metal and other surfaces than is found for acrylonitrile polymers.

I claim:

A method for making an improved polymethacrylonitrile which comprises polymerizing in an inert atmosphere methacrylonitrile monomer in a reaction medium consisting essentially of a material selected from the group consisting of toluene, dioxane and tetramethylene cyclic sulfone with incremental addition of n-butyl lithium as catalyst to the polymerizable mixture over a period of about twelve minutes with intimate mixing of the reaction ingredients and at a temperature between about $-78°$ C. and $30°$ C. and obtaining solid polymethacrylonitrile having a softening point of about $135°$ C., a density of about 1.120, and being substantially insoluble in acetone.

References Cited in the file of this patent

UNITED STATES PATENTS

| | | |
|---|---|---|
| 2,377,779 | Hanford et al. | June 5, 1945 |
| 2,412,034 | D'Alelio | Dec. 3, 1946 |
| 2,439,528 | Roedel | Apr. 13, 1948 |
| 2,448,976 | Heiligmann | Sept. 7, 1948 |
| 2,608,555 | Bullitt | Aug. 26, 1952 |
| 2,685,575 | Heiligmann et al. | Aug. 3, 1954 |
| 2,841,574 | Foster | July 1, 1958 |
| 2,842,474 | Pratt | July 8, 1958 |
| 2,977,337 | Schuller | Mar. 28, 1961 |

OTHER REFERENCES

Beaman: Journ. Amer. Chem. Soc., vol. 70, pages 3115–3118 (1948).

Korotkov et al.: Abstracts, IXth Congress on the Chemistry and Physics of High Polymers, Moscow, January 1957.

C. F. Gaylord et al.: Linear and Stereoregular Addition Polymers, Interscience (1959), pages 254 and 259.

"Polyethylene," by Raff et al., published 1956 by Interscience Publisher, N.Y., page 61.